(12) United States Patent
Heren et al.

(10) Patent No.: US 8,240,777 B2
(45) Date of Patent: Aug. 14, 2012

(54) DEVICE FOR CONTROLLING HYDRAULIC BRAKING OF A TRAILER HITCHED TO A TRACTOR

(75) Inventors: Jean Heren, Marny lès Compiègne (FR); André Prigent, Saintines (FR); Jean-Philippe Raisin, Gouvieux (FR)

(73) Assignee: Poclain Hydraulics Industrie, Verberie (FR)

( * ) Notice: Subject to any disclaimer, the term of this patent is extended or adjusted under 35 U.S.C. 154(b) by 688 days.

(21) Appl. No.: 12/280,387

(22) PCT Filed: Feb. 20, 2007

(86) PCT No.: PCT/FR2007/050825
§ 371 (c)(1), (2), (4) Date: Dec. 12, 2008

(87) PCT Pub. No.: WO2007/096561
PCT Pub. Date: Aug. 30, 2007

(65) Prior Publication Data
US 2009/0127927 A1 May 21, 2009

(30) Foreign Application Priority Data

Feb. 22, 2006 (FR) ...................................... 06 50606

(51) Int. Cl.
*B60T 13/14* (2006.01)

(52) U.S. Cl. ...................................... 303/7; 188/112 R (58) Field of Classification Search .................. 188/3 R, 188/3 H, 112 R; 303/7, 9.61
See application file for complete search history.

(56) References Cited

U.S. PATENT DOCUMENTS

| 4,181,368 A * | 1/1980 | Strom .............................. 303/15 |
| 4,796,957 A * | 1/1989 | Wakata et al. ............. 303/116.2 |
| 5,267,782 A * | 12/1993 | Engfer ...................... 303/122.09 |
| 5,382,085 A * | 1/1995 | Zbinden ........................... 303/7 |
| 5,700,074 A * | 12/1997 | Sugimoto et al. ............. 303/186 |
| 6,652,038 B1 * | 11/2003 | Frye .................................. 303/7 |
| 7,517,026 B1 * | 4/2009 | Herbst et al. ...................... 303/3 |
| 2002/0180257 A1 | 12/2002 | Gill et al. |

FOREIGN PATENT DOCUMENTS

FR 2 661 381 A3 10/1991

OTHER PUBLICATIONS

International Search Report: PCT/FR2007/050825.

* cited by examiner

*Primary Examiner* — Christopher Schwartz
(74) *Attorney, Agent, or Firm* — Ladas & Parry LLP (57) ABSTRACT

A hydraulic circuit having a brake pipe suitable for being connected to a pressurized fluid source or to a pressure-free reservoir, i.e. to a reservoir without excess pressure, via a proportional pressure reducer controlled by an electronic control unit (ECU). The circuit includes link solenoid-valve means suitable for connecting the proportional pressure reducer to the reservoir or, via a calibrated pressure reducer, to the pressurized fluid source.

20 Claims, 4 Drawing Sheets

DEVICE FOR CONTROLLING HYDRAULIC BRAKING OF A TRAILER HITCHED TO A TRACTOR

BACKGROUND OF THE INVENTION

The present invention relates to a device for controlling hydraulic braking of a trailer hitched to a tractor, which device comprises a hydraulic circuit having a brake pipe suitable for being connected to a pressurized fluid source or to a pressure-free reservoir, i.e. a reservoir without excess pressure, via a proportional pressure reducer controlled by control means comprising an electronic control unit.

Such a device can serve for braking trailers of various types, in particular farm trailers. Trailers of the "Italian" type exist in which the brake can be activated in a parking situation (i.e. in a rest situation) through lack of pressure in a hydraulic control chamber, whereas it is deactivated in order to enable the trailer to move when a medium pressure (e.g. in the range 8 bars to 15 bars) is maintained in that chamber, and it is reactivated for service braking (i.e. braking while the trailer is moving) when the pressure reaches a much higher value (in particular in the range 15 bars to 140 bars). The parking braking also performs emergency braking which is activated naturally when an incident occurs.

Trailers of the "French" type also exist that have service braking only, that braking being controlled by increasing the pressure in a hydraulic control chamber. In a variant, certain French-type trailers are each equipped with an energy accumulation device making emergency braking possible by feeding the control chamber.

Braking control devices of this type are subjected to contradictory requirements. Firstly, they must make it possible to increase the pressure rapidly in the brake pipe, so as to obtain intense braking whenever necessary. That requires the proportional pressure reducer to be dimensioned in such a manner as to enable a large amount of fluid to flow through in a short time. In addition, it is necessary to adjust the pressure finely in the brake pipe so that, when the trailer is of the Italian type, it is possible to cause a pressure in the range 8 bars to 15 bars to prevail in said brake pipe, since such a pressure is necessary to enable the trailer to move unbraked, and make it possible to avoid the brakes being engaged, even partially, since such engagement might damage them.

An object of the present invention is to propose an improved and simple device that makes it possible to satisfy those two contradictory requirements.

This object is achieved by means of the fact that the circuit includes link solenoid-valve means suitable for connecting the proportional pressure reducer to the reservoir or, via a calibrated pressure reducer, to the pressurized fluid source.

In particular, the calibrated pressure reducer is set for a pressure lying in the range 8 bars to 15 bars, e.g. in the range 10 bars to 13 bars, making it possible to guarantee release of the brake system of a trailer of the Italian type. In which case, in order to achieve such brake release, the proportional pressure reducer is connected to the calibrated pressure reducer rather than being connected directly to the reservoir. It is then by operating said calibrated pressure reducer, i.e. by connecting it to the pressurized fluid source or to the reservoir, that it is possible to obtain the desired pressure in the brake pipe.

When hard braking is necessary, the link solenoid-valve means connect the proportional pressure reducer to the reservoir, and it is by operating the proportional pressure reducer, between the pressurized fluid source to which it is also connected and this link to the reservoir, that it is possible to have the desired pressure prevail in the brake pipe.

Advantageously, a pressure limiter is disposed on a link between the calibrated pressure reducer and the link solenoid-valve means.

This pressure limiter makes it possible to limit the peak pressure at the outlet of the calibrated pressure reducer, so as to make obtaining the desired pressure (e.g. in the range 8 bars to 15 bars) in the brake pipe more reliable.

In an advantageous embodiment, the proportional pressure reducer is a solenoid valve, controlled by the electronic control unit.

In another advantageous embodiment, the proportional pressure reducer is a hydraulically controlled valve including a control chamber suitable for being connected to a control fluid feed via a proportional pilot solenoid valve, itself controlled by the electronic control unit.

In which case, the electronic control unit controls the proportional pressure reducer indirectly, said electronic unit controlling the pilot solenoid valve which, itself, controls the proportional pressure reducer by suitably feeding the control chamber thereof.

Depending on the type of trailer, emergency braking is obtained by emptying the hydraulic control chamber of the brake (Italian-type trailer), or by feeding said control chamber to a sufficient pressure (French-type trailer).

With existing devices, specific adaptation is necessary when it is desired to hitch the tractor to a trailer of one of the above-indicated types, and when emergency braking is to be obtained. Such adaptation operations are tedious and costly, and they are detrimental to the flexibility of use of the tractor.

In a particularly advantageous variant embodiment, the invention makes it possible to obtain such emergency braking, without any specific adaptation. In particular, no adaptation of the trailer is necessary, since all of the elements of the device are provided on the tractor.

Advantageously, the circuit includes a hydraulic brake selector valve that, when in a link position in which the inlet and the outlet of the brake selector valve are interconnected, is suitable for causing a link pipe to be connected to a fluid feed or to a pressure-free enclosure, i.e. to an enclosure without excess pressure, and control solenoid-valve means for controlling the brake selector valve, which means are controlled by the electronic control unit, the control solenoid-valve means for controlling the brake selector valve being suitable for taking up a first working configuration in which they make it possible to feed a first control chamber of the brake selector valve with fluid so as to cause it to go into an isolation position in which the inlet and the outlet of the brake selector valve are isolated from each other by the brake selector valve, a second working configuration in which they make it possible for a second control chamber of the brake selector valve to be fed with fluid so as to cause it to go into said link position, and a neutral configuration in which neither of the two control chambers of the brake selector valve is fed with fluid, and in which the inlet of the brake selector valve is connected to the fluid feed; the device includes means for holding the brake selector valve in position when the control solenoid-valve means go from their first working configuration or from their second working configuration to their neutral configuration; the link pipe is connected to link valve means themselves connected to the brake pipe so as to enable said brake pipe to be fed with fluid or to be connected to the reservoir depending on whether the link pipe is connected to the fluid feed or to the pressure-free enclosure; and the device includes means for delivering to the electronic control unit information indicating whether the brake of the trailer is of a first type requiring brake release by fluid feed, or of a second type, the control unit taking that information into account in controlling the control solenoid-valve means for controlling the brake selector valve.

Advantageously, the link valve means include the hydraulically controlled proportional pressure reducer, and the link pipe is connected to a pilot pipe for piloting said pressure reducer.

In which case, for applying emergency braking to a trailer of the French type, the fluid coming from the link pipe urges the proportional pressure reducer to allow the brake pipe to be connected to the fluid source. For applying emergency braking to a trailer of the Italian type, the link pipe is not fed with fluid so that the proportional pressure reducer allows the brake pipe to be connected to the reservoir.

It is also possible to imagine having the link pipe connected to the brake pipe via selection means for selecting the higher of the pressures at the outlet of the proportional reducer and in the link pipe, so as to feed the brake pipe directly when applying emergency braking to a trailer of the French type, or so as to enable said brake pipe to be connected to the reservoir when applying emergency braking to a trailer of the Italian type.

For example, the control solenoid-valve means comprise two two-position solenoid valves or one solenoid valve suitable for taking up three positions.

BRIEF DESCRIPTION OF THE DRAWING FIGURES

The invention can be better understood and its advantages appear more clearly on reading the following detailed description of embodiments shown by way of non-limiting example. The description refers to the accompanying drawings, in which.

DETAILED DESCRIPTION OF THE PREFERRED EMBODIMENTS

Figure 1:
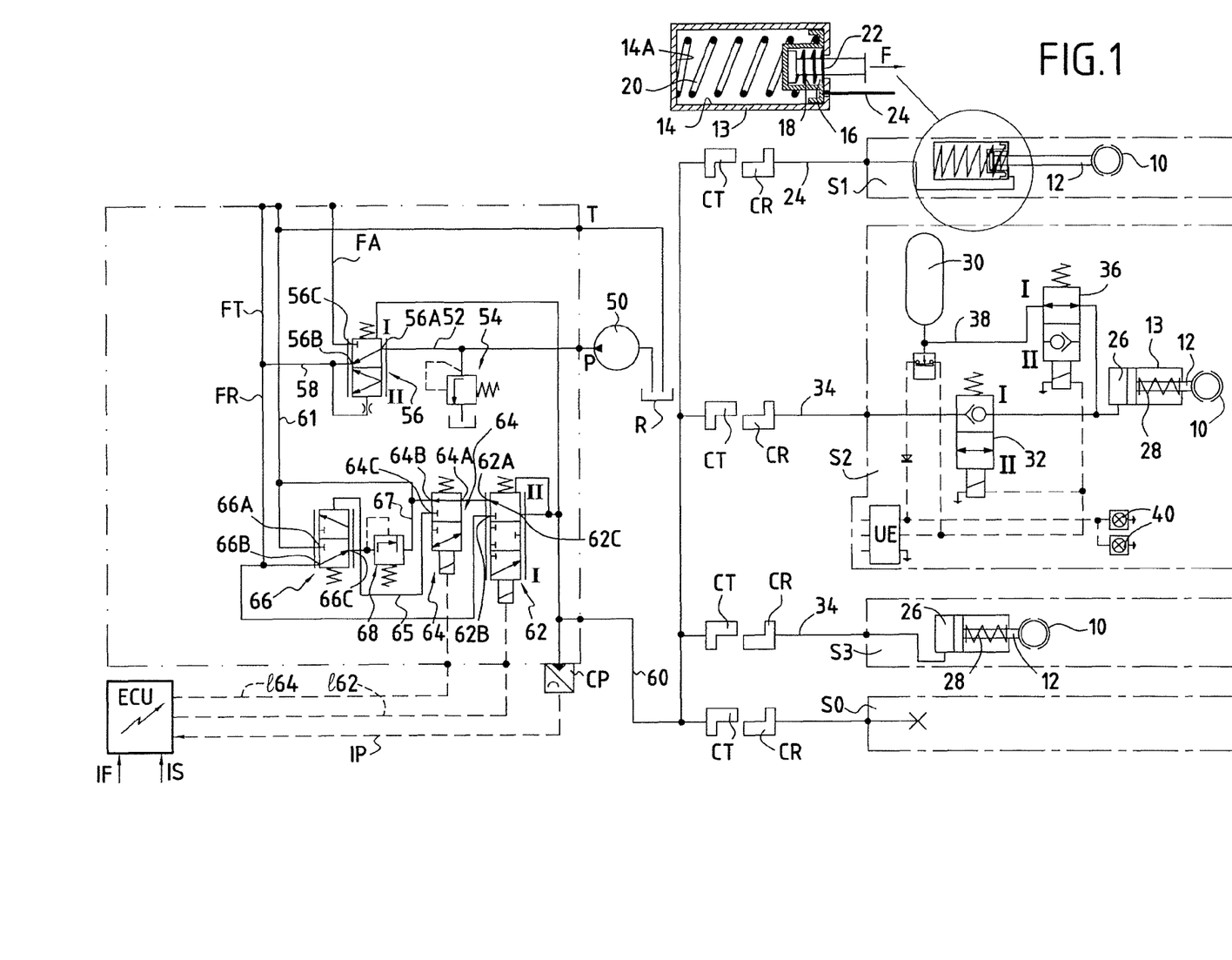
FIG. 1 is a diagrammatic view of a device of the invention, in a first embodiment.

Firstly, the right portion of FIG. 1 is described. That portion shows the possible examples of trailer braking systems S1, S2, S3 and shows a situation S0 in which no trailer is hitched to the tractor.

System S1 is of the Italian type. It comprises mechanical brake members, e.g. brake linings 10 that must be moved apart against the inside periphery of a hub in order to perform braking. They are controlled by a hydraulic actuator system comprising a piston 12 mounted to move in a cylinder 13, and hydraulic control means which, as can be seen more clearly in the enlargement, comprise a main enclosure 14 and a secondary enclosure 16. The secondary enclosure 16 is defined, inside the main enclosure, by a moving cup 18 that is urged continuously in the braking direction by a main return spring 20. The rod of the piston 12 is urged continuously towards the end wall of the cup by a secondary spring 22. A hydraulic pipe 24 is connected to the main enclosure 14. It can be understand that, when said hydraulic pipe is not fed with fluid, the actuator is in the position shown in FIG. 1, in which position the spring 20 pushes the piston away, so that braking is active, in the parking brake situation. In order to release the brake, i.e. in order to deactivate the parking brake so as to enable the trailer to move, the main enclosure must be fed with pressurized fluid via the pipe 24. For a given pressure corresponding to the calibration of the spring 20 (e.g. approximately in the range 8 bars to 15 bars), the cup 18 is pushed back towards the end wall 14A of the main enclosure against the return force of the spring 20, thereby enabling the piston 12 to move to the extent necessary for releasing the brake. When, starting from this situation, it is necessary to apply service braking, the feed pressure in the pipe 24 is increased further, and the increased pressure makes it possible to move the piston rod 12 away from the end wall of the cup 18 against the return force of the secondary spring 22, thereby urging the mechanical brake members towards their braking position. If the brake fluid feed ceases, emergency braking is automatically applied because the situation returns to the parking brake situation. It can thus be understood that this type of trailer requires:

absence of pressure in the pipe 24 in order to enable the parking brake or emergency brake to be activated;

medium pressure in that pipe in order to enable the brakes to be released; and increased pressure in that pipe in order to activate the service brake.

System S2 comprises mechanical brake members 10 and 12, e.g. of the same type as the mechanical brake members of system S1. The piston 12 is mounted to move in a cylinder 13, and braking is caused by feeding a brake chamber 26 with fluid, which brake chamber is situated on one side of the piston, against the return force exerted by a return spring 28 that is, for example, situated on the other side. Braking system S2 is of the French type, with accumulation. It includes an accumulator 30 that enables emergency braking to be activated. The braking system equipping the trailer of the type S2 also includes a solenoid valve 32 interposed on the brake pipe 34 connected to the hydraulic chamber 26, and a solenoid valve 36 disposed on the branch 38 that connects the accumulator 30 to the pipe 34, downstream from the solenoid valve 32. These solenoid valves are controlled by an electrical unit UE, which unit also controls the brake lights 40 of the trailer.

When the trailer is to be enabled to move, the solenoid valves 32 are 36 are caused to go to their controlled position II, and the hydraulic fluid can flow in the pipe 34 so as to empty the brakes. In order to apply braking for the first time, the hydraulic fluid flows in the direction for filling the brake chamber 26 which, by being filled, causes braking to take place. While the chamber 26 is being filled, since the solenoid valve 36 is in its controlled position II, the fluid can flow from the pipe 34 towards the accumulator 30 via the solenoid valve 36, without being able to return in the opposite direction towards the chamber 26. The accumulator is thus filled with fluid the first time braking is applied.

For emergency braking, the solenoid valves 32 and 36 cease to be fed, so that they return to their position I. Thus, the fluid contained in the accumulator 30 can flow towards the chamber 26 so as to cause braking to occur, and the fluid is not removed from said chamber because the valve 32 is in its position I.

The system S3 is the system of a French-type trailer, without accumulation, the brake members 10, 12 being of the same type as above, and braking being achieved by feeding a hydraulic chamber 26 with fluid via the brake pipe 34 so as to cause the brake piston to move against the return force of a spring 28.

Conventionally, a trailer is hitched to the tractor via a coupler CT that is secured to the tractor and via a coupler CR that is secured to the trailer. These couplers make it possible to establish both an electrical connection and a hydraulic connection.

In the situation S0, no trailer is hitched and the coupler CT is not connected.

A description follows of the left portion of FIG. 1 that shows the device of the invention in a first embodiment.

The hydraulic circuit of this device includes a hydraulic pump 50 that could, in particular, be a load-sensing pump whose flow rate is regulated so as to avoid variations in flow rate under the effect of variations in load on the pump. This pump feeds a main pipe 52 in which the pressure is limited by a pressure limiter 54.

The pipe 52 makes it possible to feed the brake circuit. However, it can be desirable for the pump 50 also to be used for controlling auxiliary functions of the tractor, e.g. the suspension thereof, the actuators for raising its tow bar, the hydraulic drive for a tool, or indeed various options. For this reason, a priority valve 56 is disposed on the pipe 52. This valve serves to make it possible to perform the auxiliary functions while also making it possible to give priority to performing braking which is a safety function. Thus, the valve 56 is suitable for taking up two positions, one of which is its position I in which its inlet 56A is connected only to its first outlet 56B to which an inlet segment 58 of the brake circuit is connected. If the pressure in the pipe 52 is sufficient, the valve 56 can take up its position II, in which its inlet 56A is also connected to its second outlet 56C, making it possible, via a pipe FA, to feed the hydraulic devices necessary for performing auxiliary functions.

The inlet segment 58 can be the brake pipe directly or else, as in the example shown, it can be connected to a pipe FT that serves to provide the necessary feed for braking the tractor (the system for braking the tractor not being shown), and to a pipe FR that serves for braking the trailer, the pipes FT and FR branching off from the pipe 58.

For braking the trailer, the circuit includes a brake pipe 60 which, via a valve system, can be connected either to the pipe FR, or to a pressure-free reservoir R, i.e. to a reservoir without excess pressure. It can be understood that connecting the pipe 60 to the pipe FR via the valve system actually makes it possible to connect it to the pump 50. As can be seen in FIG. 1, the brake pipe 60 is connected to the coupler of the tractor CT so as to enable the brake of the trailer to be hydraulically controlled.

In accordance with the invention, the above-mentioned valve system comprises a proportional pressure reducer 62, link solenoid-valve means 64, and a calibrated pressure reducer 66.

More precisely, the proportional pressure reducer presents a first port 62A that is connected to the link solenoid-valve means 64, a second port 62B that is connected to the pump 50 via the pipe FR and a third port 62C that is connected to the brake pipe 60.

Depending on the position of the link solenoid-valve means, the first port 62A of the reducer 62 can be connected either to the reservoir R, via an emptying pipe 61, or to the calibrated pressure reducer 66.

The link solenoid-valve means comprise at least one solenoid valve. In this example, it is a solenoid valve 64 having three ports and two positions. The first port 64A of this solenoid valve is connected to the first port 62A of the proportional pressure reducer 62, its second port 64B is connected to the reservoir R via the pipe 61, and its third port 64C is connected to an auxiliary pipe 65.

It is this auxiliary pipe 65 that, depending on the position of the calibrated pressure reducer 66, can be connected either to the pump 50 or to the reservoir R. The calibrated pressure reducer 66 has a first port 66A connected to the reservoir R via the pipe 61, a second port 66B connected to the pump 50 via the pipe FR, and a third port 66C connected to the auxiliary pipe 65.

In conventional manner, the proportional pressure reducer 62 is controlled to go between a first end position I, in which its ports 62B and 62C are interconnected so as to connect the brake pipe 60 to the pump 50, and a second end position II, in which its ports 62A and 62C are interconnected so as to connect the brake pipe 60 to the first port 64A of the solenoid valve 64. The rest position of the reducer 62 is its position II.

The solenoid valve 64 can take up a position I that is its rest position, in which its ports 64A and 64B are interconnected, and a second position II in which its ports 64A and 64C are interconnected. It can thus be understood that, when the solenoid valve 64 is in the position I, the first port 62A of the reducer 62 is connected to the reservoir. Therefore, when the solenoid valve 64 is in this position, controlling said reducer 62 serves to connect the brake pipe 60 either to the pump 50 or to the reservoir R, via said reducer. Conversely, when the solenoid valve 64 is in its position II, then the first port 62A of the reducer 62 is connected to the auxiliary pipe 65. Therefore, in order to adjust finely the pressure in the brake pipe 60, as is necessary for releasing the brakes of a trailer of the Italian type, the proportional pressure reducer 62 and the solenoid valve 64 are placed in their positions II, and the pressure is finely adjusted by the calibrated reducer 66, to the value of the calibration pressure thereof.

A pressure limiter 68 is disposed on a branch 67 of the auxiliary pipe 65. It is connected at its inlet to the auxiliary pipe while its outlet is connected to the reservoir R. This limiter makes it possible to limit the peak pressure in the auxiliary pipe 65 and thus in the pipe 60 when the reducer 62 and the solenoid valve 64 are in their positions II for fine adjustment of the pressure.

The pressure reducer 66 is a conventional pressure reducer that maintains a pressure that is substantially constant in the auxiliary pipe 65. The reducer 62 and the solenoid valve 64 are controlled electrically, by an electronic control unit ECU, via respective control lines 162 and 164.

In the example shown, the unit ECU also receives information on the pressure in the brake pipe 60, via a line IP connected to a pressure sensor CP.

The unit ECU also receives information IS relating to the type of trailer hitched to the tractor, and braking information IF. This braking information is a function of the desired braking level, it being possible for the braking-level information to be related to the extent to which the brake control pedal or lever is actuated or to the force exerted on said pedal or lever, to the pressure of the fluid in the brake circuit of the tractor, or to any other suitable means. The control of the reducer 62 by the unit ECU takes account of the desired braking level and the control of the solenoid valve 64 takes account of the type of trailer.

In normal operation, when the information IS reveals the presence of a trailer of the Italian type, the unit ECU causes the solenoid valve 64 to go into its position I, and causes the reducer 62 to go into its rest position II, so as to connect the outlet of said reducer to the reservoir R. The brake pipe 60 is then connected to the reservoir and the parking brake is thus applied.

In order to release the parking brake and in order to enable the trailer to move, the unit ECU causes the solenoid valve 64 to go into its position II, and, for a short time, it causes the reducer 62 to go into its position I, thereby connecting the port 62B of the reducer to the pump 50, and thereby enabling the brake pipe to be fed rapidly with fluid until a pressure of in the range 10 bars to 15 bars is obtained therein. The control signal for operating the reducer 62 is rapidly brought to zero so that said reducer returns to its rest position II. Since the solenoid valve 64 is in its position II, the brake pipe 60 is then connected to the port 66C of the reducer 66 which adjusts more finely the pressure in the brake pipe so as to maintain therein a pressure of approximately in the range 10 to 13 bars, so as to guarantee that the brakes of the trailer are released.

The duration of the control signal for operating the reducer 62 to achieve a pressure of in the range 10 bars to 15 bars in the brake pipe, before performing fine adjustment by the reducer 66, can be determined by trials. By way of a variant, the unit ECU can be parameterized to bring this signal to zero once the pressure in the pipe 60, as measured by the sensor CP, reaches the desired value.

In order to enable service braking to be applied to the trailer while it is moving, it is the reducer 62 that is caused to go between its positions II and I in such a manner as to obtain the desired pressure level (in the range 18 bars and 140 bars) in the brake pipe.

When the information IS reveals the presence of a trailer of the French type, the unit ECU places the solenoid valve 64 and the reducer 62 in their rest positions, so that the brake pipe 60 is connected to the reservoir. The French-type trailer can then move. In order to brake such a trailer, the reducer 62 is caused by the control unit ECU to deliver a desired pressure that can reach a maximum value of 140 bars or 150 bars, while the solenoid valve 64 remains in its rest position I.

Figure 2:
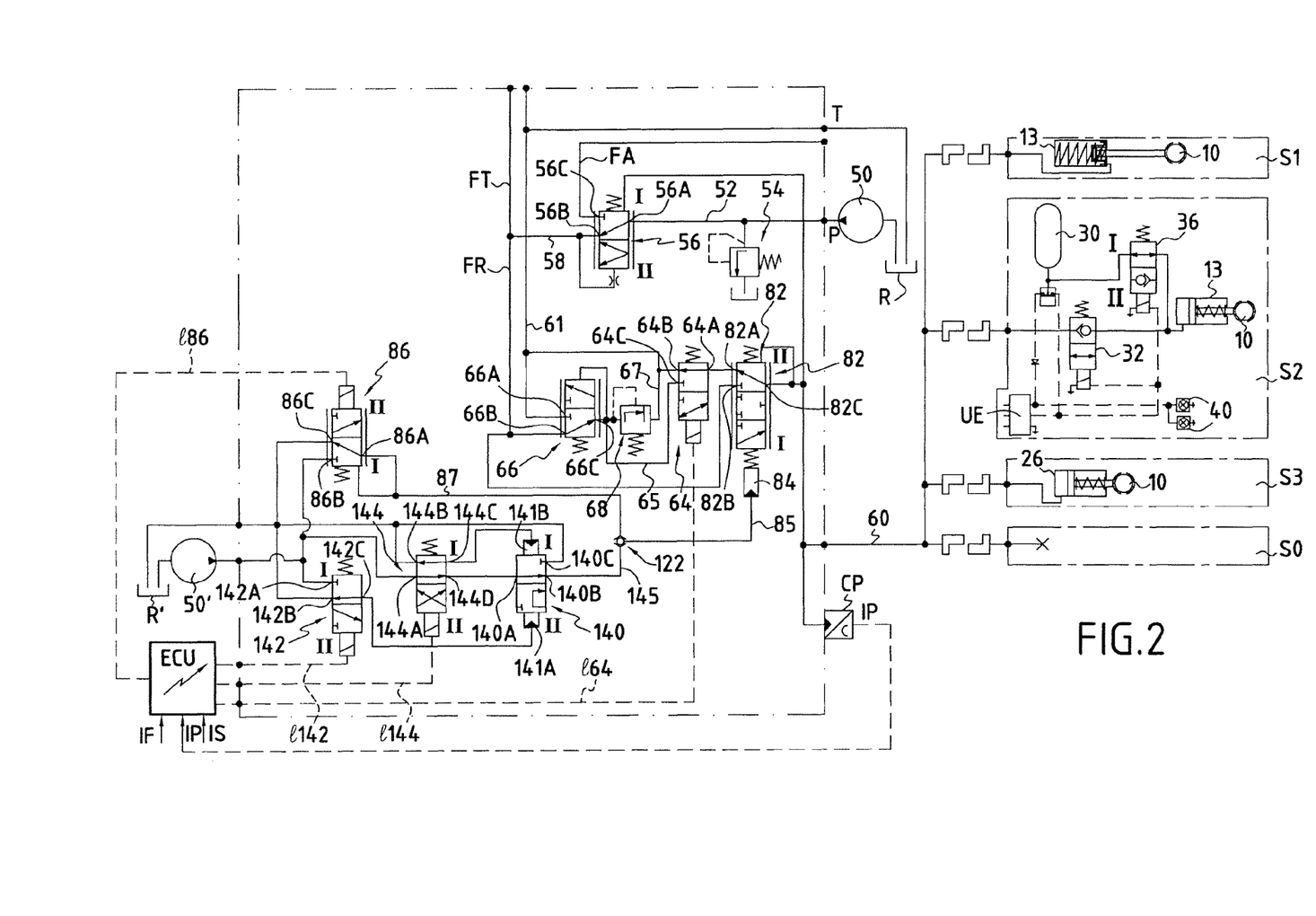
FIGS. 2 and 3 are views analogous to the FIG. 1 view, for other embodiments.

A description follows of FIG. 2, in which the elements that are unchanged relative to FIG. 1 are designated by like references.

In FIG. 2, the proportional pressure reducer is a hydraulically controlled valve 82 comprising a control chamber 84 that can be connected to a fluid feed via a proportional pilot solenoid valve 86, itself controlled by the electronic control unit ECU, via a control line l86.

More precisely, the pilot solenoid valve 86 has a first port 86A that, via a control pipe 87, is connected to a pilot pipe 85 itself connected to the control chamber 84, a second port 86B that is connected to a pump 50' for feeding that pipe with fluid, and a third port 86C that is connected to a pressure-free enclosure R'. The pumps 50 and 50' could be constituted by a single pump, or else by two different pumps. In particular, the fluid used for piloting the proportional pressure reducer 82 can have properties different from the properties of the fluid that is used for braking via the brake pipe 60, and, for example, can have different viscosity. In which case, the pump 50' is an auxiliary fluid source, different from the pump 50, generally having a lower flow rate and a lower pressure, and thus being smaller in size and less expensive, and the pressure-free enclosure R' is different from the reservoir R.

The pilot solenoid valve 86 takes up, at rest, an end position I, in which its ports 86A and 86C are interconnected, while it can be caused, by a signal issued into the control line l86 by the unit ECU, to go into its end position II, in which its ports 86A and 86D are interconnected.

The proportional pressure reducer 82 has ports 82A, 82B, and 82C that are respectively analogous to the ports 62A, 62B, and 62C of the reducer 62 of FIG. 1. In its rest position II, its ports 82A and 82C are interconnected while, in its controlled position I, its ports 82B and 82C are interconnected. The links between the ports 82A, 82B and 82C and the various pipes of the circuit are the same as the links between the ports 62A, 62B, and 62C of the reducer of FIG. 1 and the same pipes.

When the pilot solenoid valve 86 takes up its position I, the link between its ports 86A, 86C connects the control chamber 84 of the reducer 82 to the pressure-free enclosure R', thereby enabling the reducer 82 to take up its position II. Thus, the same operation is obtained as when the reducer 62 of FIG. 1 is in its position II.

When the pilot solenoid valve 86 is in the position II, the link between its ports 86A and 86B makes it possible to connect the pilot pipe 85 to the pump 50'. Thus, when said solenoid valve 86 is piloted by an electrical signal in the line l86 to its position II, said solenoid valve makes it possible to establish in the control pipe 87 a pressure that is proportional to the signal transmitted by the unit ECU, and to feed the control chamber 84 of the reducer 82 with fluid so as to urge it into its position I in which it feeds the brake pipe 60 to the pressure that corresponds to the braking intensity needed for braking the trailer. Operation is then the same as operation of the reducer 62 of FIG. 1.

The advantage of the hydraulically controlled pressure reducer 82 with a pressure multiplication stage is that it accommodates high flow rates while requiring only one electrical control stage, implemented by the pilot solenoid valve 86, which can then be of small size in order to generate a control pressure and a flow-rate that are low.

The circuit shown in FIG. 2 also includes a hydraulic brake selector valve 140 controlled hydraulically by control solenoid-valve means which, in this example, comprise two solenoid valves, respectively 142 and 144. This selector valve 140 can thus take up an link position I in which the inlet 140A and the outlet 140B of the selector valve 140 are interconnected and an isolation position II in which said inlet and said outlet are isolated from each other. In addition to its inlet and to its outlet, the brake selector valve 140 has an auxiliary port 140C that is connected to the pressure-free enclosure R'. When this selector valve is in the link position I, the inlet and the outlet 140A and 140B are interconnected while being isolated from the auxiliary port 140C, whereas, when the selector valve is in the isolation position II, its outlet 140B is connected to said auxiliary port 140C while being isolated from the inlet 140A.

The first solenoid valve 142 for controlling the selector valve 140 has a first port 142A connected to the pump 501, a second port 142B connected to the reservoir R' and a third port 142C connected to a first control chamber 141A of the selector valve 140. The second solenoid valve 144 has a first port 144A connected to the pump 501, a second port 144B connected to the reservoir, a third port 144C connected to the second control chamber 141B of the selector valve 140, and a fourth port 144D connected to the first port 140A of the selector valve 140.

The solenoid valves 142 and 144 are controlled by the unit ECU via respective ones of the control lines l142 and l144. In the absence of a control signal, the solenoid valve 142 takes up its position I, in which its second and third ports 142B and 142C are interconnected while being isolated from its first port 142A whereas, when it is controlled, the solenoid valve takes up its second position II in which its first and third ports 142A and 142C are interconnected while being isolated from its second port 142B. It can be understood that when it takes up its first position I shown in FIG. 2, the solenoid valve 142 connects the hydraulic control chamber 141A of the selector valve 140 to the reservoir R' whereas, when it takes up its position II, it connects said chamber to the pump 50'.

Similarly, the second solenoid valve 144 takes up its position I without any electrical signal in its control line l144 connected to the unit ECU, in which position its second and third ports 144B and 144C are interconnected (so that the hydraulic control chamber 141B of the selector valve 140 is connected to the reservoir R') whereas its first and fourth ports 144A and 144D are interconnected (so that the inlet 140A of the selector valve is connected to the pump 50'). When it is controlled by a signal in the line l144, the solenoid valve 144 takes up its position II, in which its first and third ports are interconnected and its second and fourth ports are also interconnected, so that the hydraulic control chamber 141B of the selector valve is connected to the pump 50'.

The inlet 140A of the selector valve 140 is connected to the fourth port 144D of the solenoid valve 144, whereas its outlet 140B is connected to a link pipe 145 and its auxiliary port 140C is connected to the reservoir R'. It can be understood that, when the selector valve 140 is in its position I shown in FIG. 2, and when the solenoid valve 144 is also in its position I, the link pipe 145 is fed with fluid coming from the pump 50. Conversely, when the selector valve 140 is in its position II, its outlet 140B is isolated from its inlet 140A, and is thus no longer fed by the pump 50'. Conversely, when the auxiliary port 140C is present, the outlet 140B is then connected to the reservoir R'.

The solenoid valves 142 and 144 can take up a first working configuration, in which the solenoid valve 142 is in the position II whereas the solenoid valve 144 is in the position I, so that the control chamber 141A is fed with fluid and thus urges the selector valve 140 into its isolation position II in which its inlet and its outlet are isolated from each other. In which case, the link pipe 145 is no longer fed with fluid. In this example, since the two solenoid valves 142 and 144 are urged naturally back into their positions I, this first working configuration is obtained by issuing a control signal into the line l144 but not into the line l144.

The solenoid valves 142 and 144 can take up a second working configuration, in which the solenoid valve 142 is in its position I while the solenoid valve 144 is in its position II, so that the control chamber 141B is fed with fluid and urges the selector valve 140 to be moved into its link position I in which its inlet and its outlet 140A and 140B are interconnected. In this second working configuration, the inlet 140A of the selector valve 140 is, in addition, connected to the reservoir R' via the link between the ports 144B and 144D of the second solenoid valve 144, so that the pipe 145 can be connected to said reservoir R'. Thus, the inlet 140A of the selector valve 140 is connected to the reservoir R' at least when the solenoid valves 142 and 144 are in their second working configuration.

The solenoid valves 142 and 144 can, in addition, take up a neutral configuration, in which they are both in position I, so that neither of the two control chambers 141A and 141B of the brake selector valve 140 is fed with fluid; they are then substantially at the same pressure. This neutral configuration is obtained in the absence of any control signal in the lines l142 and l144.

When the solenoid valves 142 and 144 go from one of their working configurations to their neutral configuration, the selector valve 140 remains in the position it has taken up, through the existence of holding means that are described below. Thus, if the solenoid valves 142 and 144 were in their second working configuration, the selector valve 140 remains in its link position I. However, since the solenoid valve 144 is in its position I in said neutral configuration, the link pipe 145 is then connected to the fluid feed via the link between the first and second ports 144A and 144D of the solenoid valve 144. Conversely, if the solenoid valves go from the first working configuration to their neutral configuration, the selector valve 140 remains in its isolation position II.

The link pipe 145 is connected to the pilot pipe 85 of the reducer 82. More precisely, the pilot pipe 85 is connected to said link pipe and to the control pipe 87 of the pilot solenoid valve 86 via selection means for selecting the higher of the pressures in the pipes 87 and 145. These means are constituted, in this example, by a shuttle valve 122.

Operation is as follows. When the information IS transmitted to the unit ECU reveals that a trailer of the Italian type is hitched to the tractor, the unit ECU issues a signal into the control line l142 so as to cause the solenoid valve 142 to go into its position II, while the solenoid valve 144 remains in its position I. The solenoid valves 142 and 144 are thus in their first working configuration. In which case, the selector valve 140 is placed in its isolation position II and the link pipe 145 is not fed with fluid (it is even connected to the reservoir R' when, as in the example, the auxiliary port 140C is present). It is thus by means of the pressure in the control pipe 87 of the pilot solenoid valve 86 that the reducer 82 can be caused to go between its positions I and II. Thus, in order to release the parking brake of the trailer, the solenoid valve 64 is caused to go into its position II by a signal in the line l64, and it is by piloting the calibrated pressure reducer 66 that it is possible to deliver, in the brake pipe 60, the pressure of in the range 10 to 15 bars that is necessary for this brake release. However, the pilot solenoid valve 86 can receive, for a short time, a signal different from zero via its control line l86 in order to feed the control chamber 84 of the reducer with a pressure that takes account of the multiplication factor of the hydraulic control means of said reducer 82 so as to deliver, at the outlet of said reducer 82, an outlet pressure of approximately in the range 10 bars to 15 bars with the advantage of rapidly filling the brake cylinders. This signal of line l86 can be brought rapidly to zero so that the fine adjustment of the pressure in the brake pipe then takes place by adjusting the reducer 66 only. As in FIG. 1, the pressure limiter 68 makes it possible to limit the brake-release peak pressure to within the desired limits.

In order to apply service braking for braking the trailer while it is moving, the reducer 82 is piloted into its position I by controlling the pilot solenoid valve 86 as results from a signal issued into the line l86, so as to obtain the desired pressure in the brake pipe 60.

The hydraulic brake selector valve 140 and its control solenoid valves 142 and 144 make it possible to obtain emergency braking in the event of electrical failure. In such an event, the solenoid valves return to their rest positions and, in particular, the solenoid valve 142 is brought to its position I, so that the solenoid valves 142 and 144 are in their neutral configuration. The selector valve 140 remains however in its isolation position II by being held in position by its holding means that are described below, so that its inlet 140A is isolated from its outlet 140B. The pilot solenoid valve 86 is then in its rest position I so that the control pipe 87 is connected to the reservoir R'. Thus, the control chamber 84 of the reducer 82 is not fed with pressurized fluid, and said reducer takes up its rest position II, while the link solenoid valve 64 is in its rest position I, so that the port 82C of the reducer 82 is connected to the reservoir R. Thus, the brake pipe is not fed with fluid, and the parking brake is applied.

When the information IS given to the unit ECU reveals that a French-type trailer is hitched, said unit ECU issues a control signal into the line l144 so as to cause the solenoid valve 144 to go into its position II, whereas no signal is issued into the line l142 so that the solenoid valve 142 remains in its position I. These control solenoid valves 142 and 144 are then in their second working configuration. In this situation, the second control chamber 141B of the selector valve 140 is connected to the pump 50l, so that the selector valve 140 is piloted into its link position I. Insofar as, in this situation, the solenoid valve 144 is in its position II, the link pipe 145 is then connected to the reservoir R'. It is thus by the pressure I in the pilot pipe 87 that the reducer 82 is piloted. In order to enable the trailer to move, the reducer 82 remains in its rest position II and the link solenoid valve 64 also remains in its rest position I. The brake pipe 60 is then connected to the reservoir R via the reducer 62 and via the solenoid valve 64, thereby enabling the brake cylinders to be emptied. The trailer is then in the unbraked configuration.

For service braking, the reducer 82 is piloted in such a manner as to reach its position I. For this purpose, a control signal in the line l86 corresponding to the desired braking level places the pilot solenoid valve 86 in its position II, so that the control pipe 87 is fed with fluid by the pump 50' at a pressure that enables the control chamber 84 of the reducer 82 to be fed with fluid so as to position said reducer in its position I, in which the brake pipe 60 is connected to the pump 50 and fed at the pressure corresponding to the desired braking level.

In the event of electrical failure, the solenoid valves take up their rest positions. Thus, the link solenoid valve 64 is in its position I, as is the pilot solenoid valve 86. The control solenoid valves 142 and 144 are in their respective rest positions, corresponding to their neutral configurations. Therefore, the control chambers 141A and 141B of the selector valve 140 are not fed with fluid, but said selector valve remains in its link position I by means of its holding means for holding it in position. Insofar as the solenoid valve 144 is then in its rest position I, the link pipe 145 is fed with fluid coming from the pump 50', thereby making it possible to feed the control chamber 84 of the reducer 82 via said link pipe (the control pipe 87 is connected to the reservoir R', so that the pressure in the pipe 145 prevails over the pressure in the pipe 87 and thus feeds the pilot pipe 85 via the shuttle valve 122).

In the above-described example, the control solenoid-valve means for controlling the hydraulic brake selector valve 140 comprise two solenoid valves 142 and 144, each of which has two positions.

Figure 3:
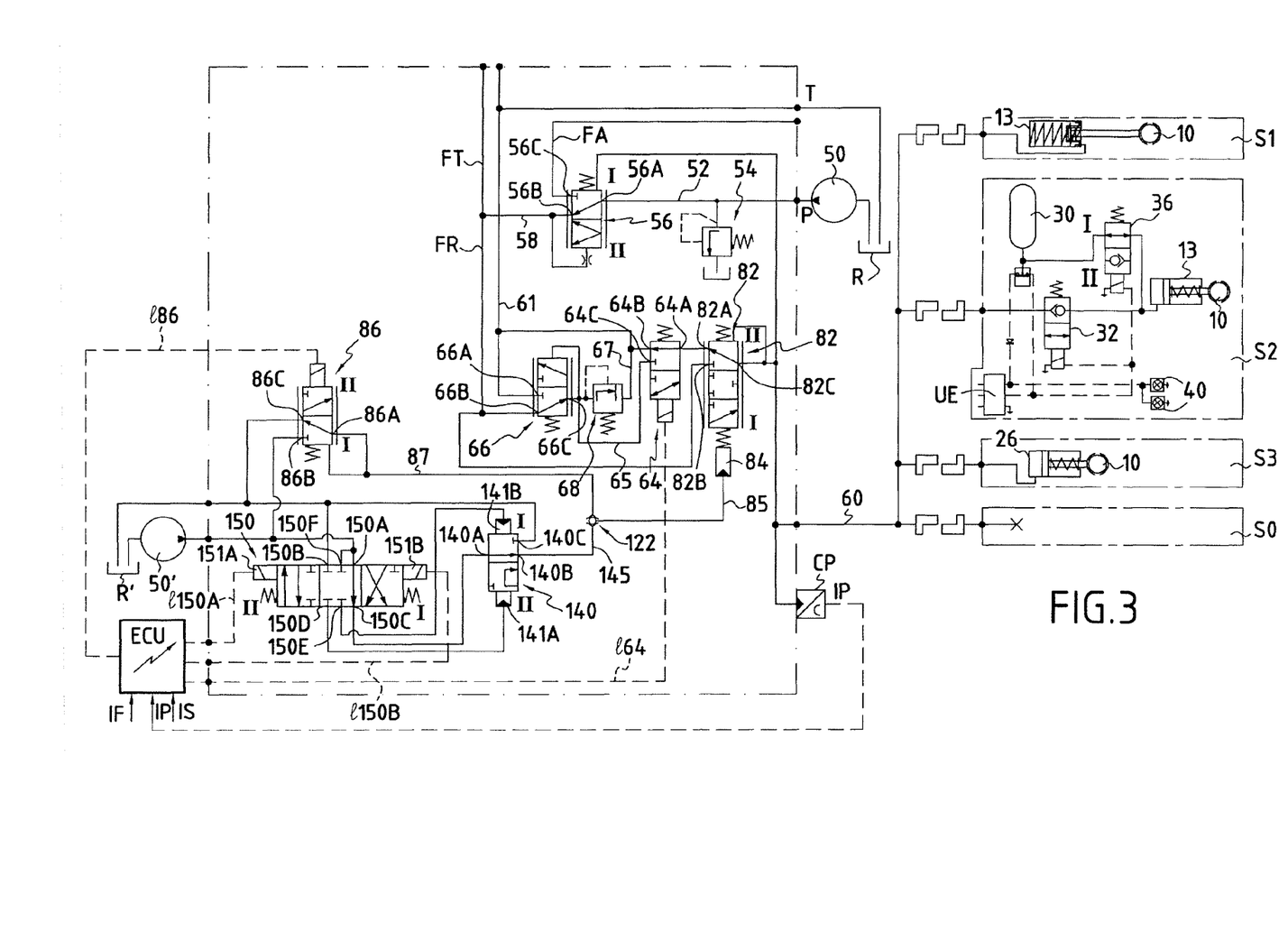

A description follows of FIG. 3, in which elements unchanged relative to FIG. 2 are designated by like references. In FIG. 3, the control means of said selector valve 140 comprise a single three-position solenoid valve 150. This solenoid valve has a first port 150A connected to the pump 50', a second port 150B connected to the reservoir R', a third port 150C connected to the first port 140A of the selector valve 140, a fourth port 150D connected to the first control chamber 141A of the selector valve 140, and a fifth port 150E connected to the second control chamber 141B of the selector valve 140. In this example, the solenoid valve 150 can be a six-port solenoid valve which is a type more common than a five-port solenoid valve, the sixth port 150F being deactivated, by being, for example, connected continuously to the first port 150A.

Issuing a signal into the control line l150B connected to the control means 151B makes it possible to place the control solenoid valve 150 in its first position I, which is its first working configuration, in which the first control chamber 141A of the selector valve 140 is fed with fluid. Issuing a signal into the line l150A connected to the control means 151A makes it possible to place the control solenoid valve 150 in its second position II, which is the second working configuration, in which it is the control chamber 141B that is connected to the fluid feed. When the solenoid valve 150 is in the position I, the ports 150A and 150D are interconnected, and the ports 150B and 150E are interconnected. In the second working configuration, the ports 150B and 150D are interconnected are the ports 150A and 150E are interconnected.

When no control signal is issued, the solenoid valve 150 takes up its neutral position 0, in which the ports 150A and 150C are interconnected so as to enable the first port 140A of the selector valve 140 to be connected to the pump 50', whereas the other ports of the solenoid valve are isolated. The device operates in the same way as the device described above with reference to FIG. 2.

Figure 4:
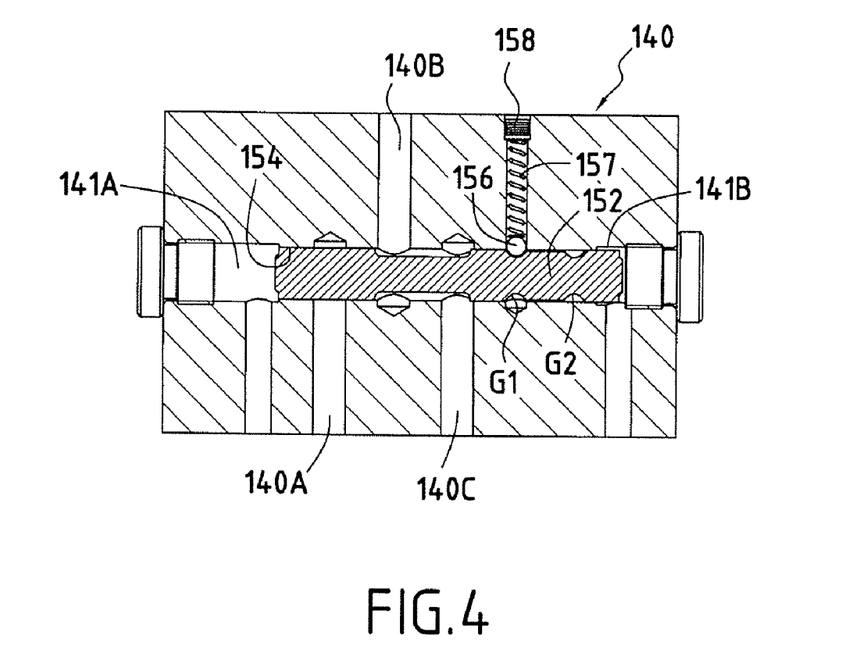
FIGS. 4 and 5 show the structure of a hydraulic brake selector valve suitable for being part of the device of the invention, with the selector valve being in respective ones of two positions.
Figure 5:
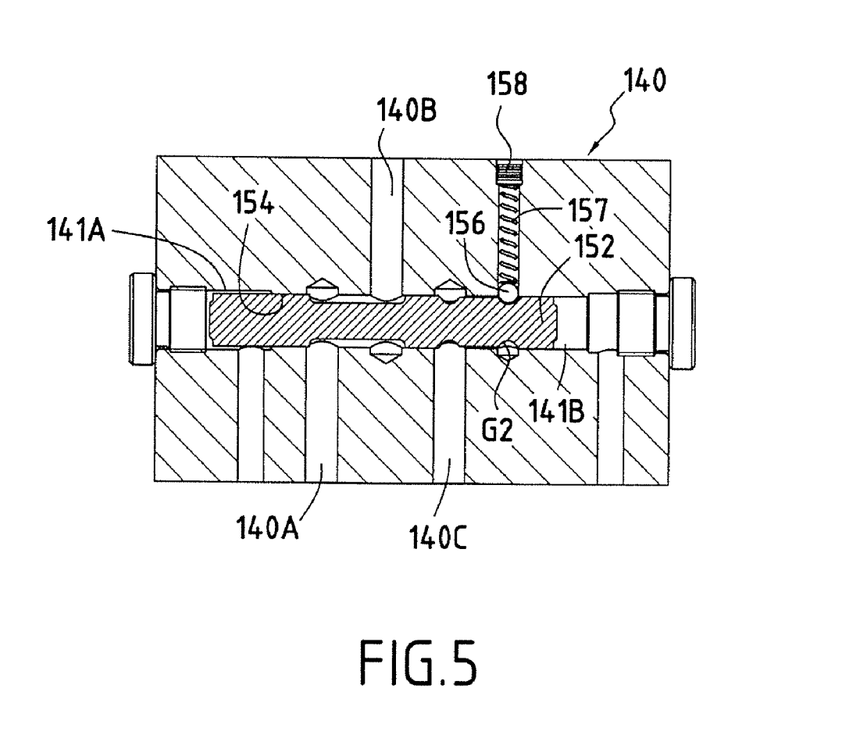

With reference to FIGS. 4 and 5, a description follows of the means that make it possible to hold the selector valve 140 in position when it ceases to be urged by its control chambers 141A and 141B being fed. It can be seen that this selector valve comprises a slide 152 that is mounted to move in a bore 154. Various ports of the selector valve open out into this bore, namely its inlet 140A, its outlet 140B, and its auxiliary port 140C. In FIG. 4, the selector valve 140 is in its isolation position II, its outlet 140B being connected to the auxiliary port 140C while the inlet 140A is isolated. In FIG. 5, the selector valve is in its link position I, the inlet 140A being connected to the outlet 140B while the auxiliary port 140C is isolated.

The means for holding the selector valve in position comprise resilient means secured to the bore 154 and that are urged continuously back towards a holding position in which, when they are facing a groove in the slide, they project into said groove. In this example, the resilient means comprise a ball 156 urged back continuously against the wall of the slide 152 by a spring 157 disposed in a bore perpendicular to the bore 154 and closed off by a stopper 158 at its end opposite from the bore 154. The slide is provided with two grooves, respectively G1 and G2. In FIG. 4, the ball 156 penetrates into the groove G1, thereby tending to hold the slide 152 in its position II even when the pressure in the chamber 141A decreases when the control solenoid-valve means return to their neutral position. In FIG. 5, the ball 156 is in contact with the bottom of the groove G2, thereby tending to hold the slide in its position I even if the pressure in the chamber 141B decreases when the control solenoid-valve means return to their neutral position.

Naturally, it is possible to invert the holding means for holding the selector valve in position, by making provision for the resilient means to be secured to the slide, and, when they are facing a groove in the bore, for them to project into said groove. For example, in this situation, the resilient means could be of the spring clip type tending naturally to take up a radially expanded configuration.

The control signals for controlling the solenoid valves and the information received by the unit ECU can be transmitted by wire or wireless links.

What is claimed is:

1. A device for controlling hydraulic braking of a trailer hitched to a tractor, which device comprises a hydraulic circuit having a brake pipe suitable for being connected to a pressurized fluid source or to a pressure-free reservoir via a proportional pressure reducer controlled by an electronic control unit and including a link solenoid-valve arrangement comprising at least one link solenoid-valve suitable for connecting the proportional pressure reducer to the reservoir or, via a calibrated pressure reducer, to the pressurized fluid source, wherein the circuit includes a hydraulic brake selector valve that, when in a link position in which the inlet and the outlet of the brake selector valve are interconnected, is suitable for causing a link pipe to be connected to a fluid feed or to a pressure-free enclosure, and at least one control solenoid-valve for controlling the brake selector valve, which control solenoid-valve is controlled by the electronic control unit, the control solenoid-valve for controlling the brake selector valve being suitable for taking up a first working configuration in which said control solenoid-valve makes it possible to feed a first control chamber of the brake selector valve with fluid so as to cause said brake selector to go into an isolation position in which the inlet and the outlet of the brake selector valve are isolated from each other by the brake selector valve, a second working configuration in which said control solenoid-valve makes it possible for a second control chamber of the brake selector valve to be fed with fluid so as to cause said break selector to go into said link position, and a neutral configuration in which neither of the two control chambers of the brake selector valve is fed with fluid, and in which the inlet of the brake selector valve is connected to the fluid feed, wherein the device includes at least one holder for holding the brake selector valve in position when the control solenoid-valve go from the first working configuration or from the second working configuration thereof to the neutral configuration thereof; wherein the link pipe is connected to link valve means themselves connected to the brake pipe so as to enable said brake pipe to be fed with fluid or to be connected to the reservoir depending on whether the link pipe is connected to the fluid feed or to the pressure-free enclosure; and wherein the device includes an indicator for delivering to the electronic control unit information indicating whether the brake of the trailer is of a first type requiring brake release by fluid feed, or of a second type, the control unit taking that information into account in controlling the control solenoid-valve for controlling the brake selector valve.

2. A device according to claim 1, wherein the proportional pressure reducer is a hydraulically controlled proportional pressure reducer including a control chamber suitable for being connected to a control fluid feed via a proportional pilot solenoid valve, itself controlled by the electronic control unit, and wherein the link pipe is connected to a pilot pipe for piloting said pressure reducer.

3. A device according to claim 2, wherein the pilot pipe is connected to the link pipe and to a control pipe connected to the proportional pilot solenoid valve via selector valve means for selecting the higher pressure.

4. A device according to claim 2 wherein, when the control solenoid-valve is in the first and second working configurations thereof, the first and second control chambers of the hydraulic brake selector valve are respectively connected to an auxiliary pressurized fluid source, and wherein the inlet of the hydraulic brake selector valve is connected to said pressure-free enclosure at least when the control solenoid-valve is in the second working configuration thereof.

5. A device according to claim 1, wherein, when the control solenoid-valve is in the first and second working configurations thereof, the first and second control chambers of the hydraulic brake selector valve are respectively connected to an auxiliary pressurized fluid source.

6. A device according to claim 1, wherein the hydraulic brake selector valve is provided with an auxiliary port that is connected to the pressure-free enclosure, and wherein, when said selector valve is in the isolation position, the outlet of said selector valve is connected to the auxiliary port while being isolated from the inlet, whereas, when the selector valve is in the link position, the inlet and the outlet are interconnected while being isolated from the auxiliary port.

7. A device according to claim 1, wherein, when the control solenoid-valve is in the neutral configuration thereof, the two control chambers of the hydraulic brake selector valve are substantially at the same pressure.

8. A device according to claim 1, wherein the control solenoid-valve arrangement comprises two two-position solenoid valves.

9. A device according to claim 1, wherein the control solenoid-valve arrangement comprises one solenoid valve suitable for taking up three positions.

10. The device of claim 1, wherein the proportional pressure reducer is a solenoid valve, controlled by the electronic control unit.

11. The device of claim 1, wherein the proportional pressure reducer is a hydraulically controlled valve including a control chamber suitable for being connected to a control fluid feed via a proportional pilot solenoid valve, itself controlled by the electronic control unit.

12. A device for controlling hydraulic braking of a trailer hitched to a tractor, which device comprises a hydraulic circuit having a brake pipe suitable for being connected to a pressurized fluid source or to a pressure-free reservoir via a proportional pressure reducer controlled by an electronic control unit and including a link solenoid-valve arrangement comprising at least one link solenoid-valve suitable for connecting the proportional pressure reducer to the reservoir or, via a calibrated pressure reducer, to the pressurized fluid source, wherein the link solenoid-valve has a first port connected to a first port of the proportional pressure reducer, a second port connected to the reservoir, and a third port connected to an auxiliary pipe suitable for being connected to the fluid source or to the reservoir via the calibrated pressure reducer, the link solenoid-valve being suitable for being caused to interconnect said first and second ports or said first and third ports.

13. A device according to claim 12, wherein the proportional pressure reducer has a second port connected to the pressurized fluid source and a third port connected to the brake pipe, and wherein the calibrated pressure reducer has a first port connected to the reservoir, a second port connected to the pressurized fluid source, and a third port connected to the auxiliary pipe.

14. The device of claim 12, wherein the proportional pressure reducer is a solenoid valve, controlled by the electronic control unit.

15. The device of claim 12, wherein the proportional pressure reducer is a hydraulically controlled valve including a control chamber suitable for being connected to a control fluid feed via a proportional pilot solenoid valve, itself controlled by the electronic control unit.

16. A device for controlling hydraulic braking of a trailer hitched to a tractor, which device comprises a hydraulic circuit having a brake pipe suitable for being connected to a pressurized fluid source or to a pressure-free reservoir via a proportional pressure reducer controlled by an electronic control unit and including a link solenoid-valve arrangement comprising at least one link solenoid-valve suitable for connecting the proportional pressure reducer to the reservoir or, via a calibrated pressure reducer, to the pressurized fluid source, wherein a pressure limiter is disposed on a link between the calibrated pressure reducer and the link solenoid-valve.

17. A device according to claim 16, wherein the pressure limiter is disposed on a branch of the auxiliary pipe.

18. A device according to claim 16, wherein the proportional pressure reducer is a solenoid valve, controlled by the electronic control unit.

19. A device according to claim 16, wherein the proportional pressure reducer is a hydraulically controlled valve including a control chamber suitable for being connected to a control fluid feed via a proportional pilot solenoid valve, itself controlled by the electronic control unit.

20. A device for controlling hydraulic braking of a trailer hitched to a tractor, which device comprises a hydraulic circuit having a brake pipe suitable for being connected to a pressurized fluid source or to a pressure-free reservoir via a proportional pressure reducer controlled by an electronic control unit and including a link solenoid-valve arrangement comprising at least one link solenoid-valve suitable for connecting the proportional pressure reducer to the reservoir or, via a calibrated pressure reducer, to the pressurized fluid source, wherein the brake pipe comprises an output suitable for being connected to a hydraulic brake chamber, and wherein a pressure limiter is disposed on a link between the calibrated pressure reducer and the link solenoid-valve.

* * * * *